(12) United States Patent
Ren et al.

(10) Patent No.: US 11,899,781 B2
(45) Date of Patent: Feb. 13, 2024

(54) PROCESSING APPARATUS, EMBEDDED SYSTEM, SYSTEM-ON-CHIP, AND A SECURITY CONTROL METHOD FOR INTER-ENCLAVE DATA TRANSMISSION

(71) Applicant: Alibaba Group Holding Limited, Grand Cafyman (KY)

(72) Inventors: Xuanle Ren, Hangzhou (CN); Xiaoxia Cui, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 187 days.

(21) Appl. No.: 17/240,796

(22) Filed: Apr. 26, 2021

(65) Prior Publication Data

US 2021/0334361 A1    Oct. 28, 2021

(51) Int. Cl.
*G06F 21/53*     (2013.01)
*G06F 21/78*     (2013.01)
*G06F 21/60*     (2013.01)

(52) U.S. Cl.
CPC ............ *G06F 21/53* (2013.01); *G06F 21/604* (2013.01); *G06F 21/78* (2013.01)

(58) Field of Classification Search
CPC ......... G06F 21/53; G06F 21/604; G06F 21/78
USPC ......................................................... 726/26
See application file for complete search history.

(56) References Cited

U.S. PATENT DOCUMENTS

| | | | |
|---|---|---|---|
| 10,169,574 B2* | 1/2019 | Nesher ................. | G06F 21/53 |
| 10,177,914 B1* | 1/2019 | Lee ........................ | H04L 63/02 |
| 2005/0185790 A1* | 8/2005 | Le Quere ................ | G06F 21/72 |
| | | | 380/28 |
| 2007/0245409 A1* | 10/2007 | Harris .................... | H04L 67/06 |
| | | | 726/5 |
| 2008/0022363 A1* | 1/2008 | Le .......................... | G06F 21/78 |
| | | | 726/2 |
| 2016/0381005 A1* | 12/2016 | Vij ......................... | H04L 63/10 |
| | | | 726/7 |
| 2017/0061138 A1* | 3/2017 | Lambert ................. | H04L 63/18 |
| 2017/0344280 A1* | 11/2017 | Borlick .................. | G06F 3/067 |
| 2018/0025553 A1* | 1/2018 | Bajwa .................... | H04W 4/40 |
| | | | 701/32.6 |
| 2018/0114012 A1* | 4/2018 | Sood ...................... | G06F 21/79 |

(Continued)

*Primary Examiner* — Thanh T Le

(57) ABSTRACT

A processing apparatus, an embedded system, a system-on-chip, and a security control method are disclosed. The processing apparatus includes a processor, adapted to execute a program; and a memory, coupled to the processor and adapted to provide a plurality of enclaves isolated from each other. One of the plurality of enclaves is a source enclave, another one of the plurality of enclaves is a target enclave, and the source enclave and the target enclave each are used to provide a storage space required for running a corresponding program. The processing apparatus further comprises a storage access controller, adapted to transmit specified data stored in the source enclave to the target enclave. According to the processing apparatus, the embedded system, the system-on-chip, and the security control method provided in the embodiments of the present disclosure, a storage access controller can be used to implement a data transmission process from a source enclave to a target enclave, without requiring a processor for data transferring, thereby improving efficiency of inter-enclave data transmission while ensuring security.

18 Claims, 10 Drawing Sheets

(56) References Cited

U.S. PATENT DOCUMENTS

| | | | |
|---|---|---|---|
| 2018/0115514 A1* | 4/2018 | Chou | G06F 21/50 |
| 2018/0211035 A1* | 7/2018 | Costa | G06F 21/74 |
| 2019/0058722 A1* | 2/2019 | Levin | H04L 67/34 |
| 2019/0121962 A1* | 4/2019 | Coleman | H04L 63/083 |
| 2021/0103392 A1* | 4/2021 | Murray | G06F 3/0689 |
| 2021/0201586 A1* | 7/2021 | Ha | G06F 21/6245 |
| 2022/0158836 A1* | 5/2022 | Li | H04L 9/3297 |
| 2023/0042460 A1* | 2/2023 | Zhang | G06F 1/1694 |

* cited by examiner

PROCESSING APPARATUS, EMBEDDED SYSTEM, SYSTEM-ON-CHIP, AND A SECURITY CONTROL METHOD FOR INTER-ENCLAVE DATA TRANSMISSION

CROSS-REFERENCE TO RELATED APPLICATIONS

This application claims priority to Chinese Patent Application No. 202010348113.6 Filed Apr. 28, 2020, which is incorporated herein in its entirety.

TECHNICAL FIELD

The present disclosure relates to the field of processors, and more specifically, to a processing apparatus, an embedded system, a system-on-chip, and a security control method.

BACKGROUND

With continuous development of smart terminal technologies, various application programs (Application, App for short) bring convenience for users, followed by a concern about the security of these application programs by users. For application programs involving some sensitive information (for example, information not expected to be acquired by others, such as identity information and property information), users expect that such sensitive information can be effectively protected for security.

A plurality of trusted execution environments (Trusted Execution Environment, TEE) isolated from each other may be established in electronic devices, to provide an execution environment with a security protection function for application programs that need to be protected, so that different application programs can run in different trusted execution environments. In some scenarios in which an application program running in a TEE needs to transmit information to another TEE, performance of the electronic device may be limited by transmission efficiency. For example, a first application program running in a first TEE is used to collect sensor data in real time, and a second application program running in a second TEE is used to process (for example, encode and encrypt) the sensor data. In this case, after obtaining the sensor data, the first application program needs to continuously provide the sensor data stored in the first TEE to the second TEE, so that efficiency of data transmission from the first TEE to the second TEE may limit key performance, such as a response speed and a data processing capability of the electronic device.

Therefore, it is desirable that efficiency of data transmission between different TEEs can be improved on the premise of ensuring data security.

SUMMARY

In view of this, embodiments of the present disclosure provide a processing apparatus, an embedded system, a system-on-chip, and a security control method to resolve the foregoing problem.

In order to achieve this objective, according to a first aspect, the present disclosure provides a processing apparatus, including: a processor, adapted to execute a program; and a memory, coupled to the processor and adapted to provide a plurality of enclaves isolated from each other, where one of the plurality of enclaves is a source enclave, another one of the plurality of enclaves is a target enclave, and the source enclave and the target enclave each are used to provide a storage space required for running a corresponding program; where the processing apparatus further includes a storage access controller, adapted to transmit specified data stored in the source enclave to the target enclave.

In some embodiments, the plurality of enclaves further include a runtime enclave different from the source enclave and the target enclave; and the runtime enclave is adapted to provide a storage space required for running a control program, where the memory accessor is uniquely configured by the control program so that the memory accessor transmits the specified data stored in the source enclave to the target enclave.

In some embodiments, the source enclave is adapted to generate a transmission request and send the transmission request to the runtime enclave, so that the control program configures the storage access controller based on the transmission request to transmit the specified data stored in the source enclave to the target enclave.

In some embodiments, the transmission request includes source address information; and before the control program configures the storage access controller to transmit the specified data stored in the source enclave to the target enclave, the control program checks whether the source address information points to the source enclave that transmits the transmission request, and if the source address information points to the source enclave that transmits the transmission request, allows the storage access controller to transmit the specified data stored in the source enclave to the target enclave.

In some embodiments, before the control program configures the storage access controller to transmit the specified data stored in the source enclave to the target enclave, the control program checks whether a transmission function is disabled for the source enclave transmitting the transmission request, and if the transmission function is not disabled for the source enclave transmitting the transmission request, allows the storage access controller to transmit the specified data stored in the source enclave to the target enclave.

In some embodiments, the transmission request includes to-be-transmitted data amount information, and before the control program configures the storage access controller to transmit the specified data stored in the source enclave to the target enclave, the control program sends an allocation request to the target enclave, where the allocation request includes the data amount information, so that the target enclave determines whether a size of an assignable storage space in the target enclave is greater than or equal to the data amount information indicated by the allocation request. If the size of the assignable storage space in the target enclave is greater than or equal to the data amount information indicated by the allocation request, the target enclave sends a transmission acknowledgement response to the storage access controller, so that the storage access controller transmits the specified data stored in the source enclave to the target enclave.

In some embodiments, the transmission acknowledgement response includes allocated address information, and the allocated address information points to a target storage area, allowed to receive the specified data, in the target enclave; and the control program provides the allocated address information to the memory accessor, so that the storage access controller transmits the specified data stored in the source enclave to the target storage area in the target enclave.

In some embodiments, the storage access controller further includes: a source address register, adapted to store the source address information; a destination address register, adapted to store destination address information, where the destination address information points to the target enclave or a specified storage area, used for receiving the specified data, in the target enclave; and a control module, adapted to select one of a plurality of channels provided by the storage access controller as a secure channel for transmitting the specified data stored in the source enclave to the target enclave.

In some embodiments, the storage access controller further includes: a status register, adapted to provide a status value for each of the channels, where the status value is used to indicate whether a corresponding channel is in an available state, so that the control module selects, based on the status value, a channel in the available state as the secure channel.

According to a second aspect, the present disclosure provides an embedded system, including the processing apparatus in any one of the embodiments of the present disclosure. The embedded system provided by the present disclosure does not require a processor to transfer to-be-transmitted specified data during inter-enclave data transmission, so as to implement high-efficiency and low-power data transmission while ensuring data security, thereby having a broad application prospect in the embedded field (such as the Internet of Things field) featuring high power consumption, high security, and high efficiency.

According to a third aspect, the present disclosure provides a system-on-chip, including the processing apparatus in any one of the embodiments of the present disclosure. A memory, a processor, and a storage access controller in the processing apparatus may be coupled and communicate through an on-chip system bus in the system-on-chip.

According to a fourth aspect, the present disclosure provides a security control method, including: configuring a plurality of enclaves isolated from each other in a memory, where one of the plurality of enclaves is a source enclave, another one of the plurality of enclaves is a target enclave, and the source enclave and the target enclave each are used to provide a storage space required for running a corresponding program; configuring a secure channel; and transmitting specified data stored in the source enclave to the target enclave through the secure channel.

In some embodiments, the plurality of enclaves further include a runtime enclave different from the source enclave and the target enclave, and the security control method further includes: running a control program in the runtime enclave, where the secure channel is uniquely configured by the control program so that the secure channel transmits the specified data stored in the source enclave to the target enclave.

In some embodiments, the control program receives a transmission request sent by the source enclave, and configures the secure channel based on the transmission request, so that the secure channel transmits the specified data stored in the source enclave to the target enclave.

In some embodiments, the transmission request includes source address information; and before the control program configures the secure channel, the control program checks whether the source address information is within the source enclave transmitting the transmission request, and if the source address information is within the source enclave transmitting the transmission request, allows transmitting the specified data stored in the source enclave to the target enclave.

In some embodiments, before the control program configures the secure channel, the control program checks whether a transmission function is disabled for the source enclave transmitting the transmission request, and if the transmission function is not disabled for the source enclave transmitting the transmission request, allows transmitting the specified data stored in the source enclave to the target enclave.

In some embodiments, the transmission request includes to-be-transmitted data amount information, and before the specified data stored in the source enclave is transmitted to the target enclave, the control program sends an allocation request to the target enclave, where the allocation request includes the data amount information, so that the target enclave determines whether a size of an assignable storage space in the target enclave is greater than or equal to the data amount information indicated by the allocation request. If the size of the assignable storage space in the target enclave is greater than or equal to the data amount information indicated by the allocation request, the target enclave sends a transmission acknowledgement response, so that the secure channel transmits the specified data stored in the source enclave to the target enclave.

In some embodiments, the transmission acknowledgement response includes allocated address information, and the allocated address information points to a target storage area, allowed to receive the specified data, in the target enclave; and the control program configures the secure channel based on the allocated address information, so that the secure channel transmits the specified data stored in the source enclave to the target storage area in the target enclave.

In some embodiments, the step of configuring a secure channel includes: selecting one of a plurality of channels as the secure channel based on the source address information and destination address information, so that the secure channel transmits the specified data stored in the source enclave to the target enclave to which the destination address information points, or a specified storage area, used for receiving the specified data, in the target enclave.

Compared with the conventional schemes, in the processing apparatus, the embedded system, the system-on-chip, and the security control method provided in the embodiments of the present disclosure, TEEs may be established based on a plurality of enclaves, different programs may run independently in different enclaves, and the storage access controller may be configured to transmit the specified data stored in the source enclave of the plurality of enclaves to the target enclave, not requiring the processor to transfer the specified data to be transmitted. Because a transmission mechanism provided by the present disclosure does not require the processor for data transferring, compared with the prior art, the embodiments of the present disclosure can improve efficiency of inter-enclave communication, thereby increasing a response speed of programs running in the enclaves, reducing power consumption, and providing strong support for performance improvement of the electronic devices, such as the processing apparatus, the embedded system, and the system-on-chip, and improvement of user experience.

In some embodiments, the runtime enclave in the plurality of enclaves provides a trusted execution environment used for running a DMA control program, thereby further ensuring high efficiency of the process of data transmission between the source enclave and the target enclave under the premise of ensuring data security.

In some embodiments, the control program running in the runtime enclave may control the data transmission between the source enclave and the target enclave based on various preset control rules, thereby implementing flexible control and optimization of data transmission. For example, whether a data transmission direction is valid may be determined based on the control rules of the control program running in the runtime enclave, so as to avoid accidentally leaking sensitive information from an enclave to other enclaves.

In some embodiments, the control program running in the runtime enclave may initiate, based on the transmission request, an allocation request to the target enclave to be written into, so as to determine whether the target enclave has enough storage space to receive the specified data that needs to be transmitted, thereby avoid overwriting valid data in the target enclave.

BRIEF DESCRIPTION OF DRAWINGS

The above and other objectives, features, and advantages of the present disclosure will become more apparent by describing the embodiments of the present disclosure with reference to the following accompanying drawings, in which.

DESCRIPTION OF EMBODIMENTS

Figure 1:
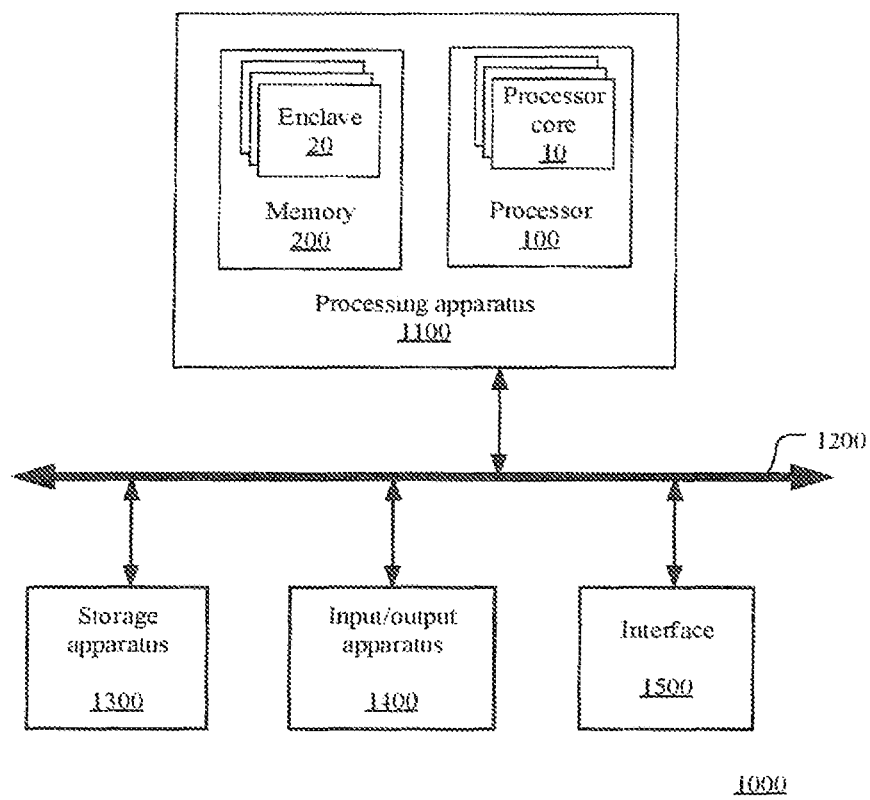
FIG. 1 is a schematic block diagram of an electronic device according to an embodiment of the present disclosure.

The following describes the present disclosure based on embodiments, but the present disclosure is not limited to the embodiments. In the following detailed descriptions of the present disclosure, some specific details are described in detail. Those skilled in the art can fully understand the present disclosure without the descriptions of the details. To avoid obscuring the essence of the present disclosure, well-known methods, processes, and procedures are not described in detail. In addition, the drawings are not necessarily drawn to scale.

The following terms are used in this specification.

Microcontroller: Microcontroller Unit, MCU for short, which generally refers to a system-level chip or a system-on-chip (System on Chip, SoC for short) implemented based on a processor, a memory, and other hardware modules. A microcontroller can run an operating system (Operating System, OS for short) and application programs. In the Internet of Things field, the artificial intelligence field, and some other fields, microcontrollers are widely applied due to their significant advantages such as being highly integrable and customizable.

Memory: a physical structure for storing information, which can be integrated into a processing apparatus. Information stored in a memory includes instruction information and/or data information represented by data signals. For example, a memory may be used for storing data provided by a processor and code of an application program, and may also be used for implementing information exchange between a processor and a storage apparatus outside the processing apparatus.

Application program: mainly used to execute a set task based on a user operation, and can be understood as software including one or more computer programs. The application program includes code and data, where the code of an application program corresponds to a series of instructions executable by a processor. Application programs may include, for example, payment application programs for implementing property transaction, service application programs for providing corresponding services based on personal information of users, game application programs, media application programs, and drivers for driving hardware resources. Data and code included in application programs involving user privacy information such as payment applications and service applications need to be protected, to prevent malicious software from using user privacy information/sensitive information without authorization.

Read/write permission: a collective term for read permission and write permission. If a specified program has read permission for a target storage area, it means that information (code and/or data) in the target storage area can be read, such that information of the target storage area can be loaded to a storage area for running the specified program. If a specified program has write permission for a target storage area, it means that the specified program can modify information in the target storage area.

Execute permission: If a specified program has execute permission for a target storage area, it means that the specified program is allowed to execute or invoke code stored in the target storage area, but the execute permission does not mean that the specified program is allowed to view or read the code stored in the target storage area.

DMA (Direct Memory Access), standing for direct memory access or referred to as direct memory access, is a fast data transfer technology, applicable to data transmission between different storage areas (for example, between different storage areas within the memory and/or between the memory and different storage areas of other storage apparatuses). The advantage of the DMA technology lies in that a data transmission path does not need to pass through the processor, that is, the data to be transmitted is directly written into the target storage area, with no need to be input to the processor and then transferred by the processor to the target storage area. A data transmission process based on the DMA technology may be referred to as DMA transmission, and the DMA transmission process is mainly implemented by a DMA controller.

The embodiments of this application can be applied to the fields such as Internet and Internet of Things (Internet of Things, IoT for short), for example, a 5G mobile Internet system or a security identification system. Trusted execution environments for protecting sensitive information can be established in the processing apparatus, to implement data transmission between different trusted execution environments by using the DMA technology. However, it should be understood that the application scenarios of the embodiments of the present disclosure are not limited thereto, but may also include any scenarios in which sensitive information needs to be protected in the processing apparatus.

System Overview

Figure 2:
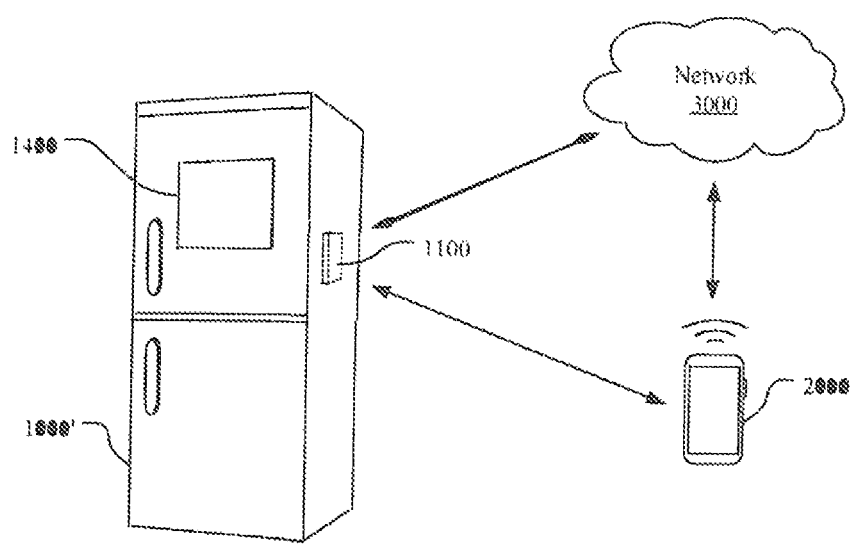
FIG. 2 is a schematic diagram of an exemplary application scenario of an electronic device according to an embodiment of the present disclosure.

FIG. 1 is a schematic block diagram of an electronic device according to an embodiment of the present disclosure. FIG. 2 is a schematic diagram of an exemplary application scenario of an electronic device according to an embodiment of the present disclosure. As described above, the application scenario shown in FIG. 2 is only used as an illustrative example, but not intended to limit practical application scenarios of the electronic device according to the embodiments of the present disclosure.

The electronic device 1000 shown in FIG. 1 is intended to show at least some components of one or more electronic apparatuses. In other embodiments of the present disclosure, the components shown in FIG. 1 may be omitted, or connections among the components are implemented with different architectures. Some hardware and/or software modules not shown in FIG. 1 may also be included, and two or more components shown in FIG. 1 may also be combined into one component in a software system and/or hardware system.

In some embodiments, the electronic device 1000 may be a mobile device, a handheld device, or an embedded device, for example, in a smart car, a smart appliance, a biological information recognition system, a bank management system, or a processing platform of Internet of Things devices using the 5G technology.

As shown in FIG. 1 and FIG. 2, the electronic device 1000 may include one or more processing apparatuses 1100. In some embodiments, the processing apparatus 1100 in the electronic device 1000 may be flexibly designed in terms of architecture and function. For example, in a scenario that requires low power consumption and a specialized function, the electronic device 1000 according to the embodiments of the present disclosure may be more simplified and have a lower power consumption than a large computer device such as a personal computer or a server terminal, and therefore is suitable for various Internet of Things devices, embedded devices, smart terminal devices, and the like.

One or more processing apparatuses 1100 in the electronic device 1000 may be a separately packaged chip (for example, a microcontroller), or may be implemented by a hardware structure and/or software integrated in a system-on-chip, or may be implemented by a plurality of hardware structures and/or software on a printed circuit board (Printed Circuit Board, PCB). The processing apparatus 1100 may include a central processing unit, a graphics processing unit, a physical processor, and so on.

In some embodiments, the electronic device 1000 may further include one or more co-processors for executing instructions and data not involving sensitive information.

As shown in FIG. 1, the electronic device 1000 further includes a system bus 1200, and the processing apparatus 1100 may be coupled to one or more system buses 1200. The system bus 1200 may be used to transmit signals between the processing apparatus 1100 and other components in the electronic device 1000, for example, transmitting addresses, data, or control signals. The system bus 1200 may include but is not limited to: a bus based on peripheral component interconnect (Peripheral Component Interconnect, PCI), a memory bus, or other types of buses.

Generally, as shown in FIG. 1, the electronic device 1000 may further include one or more storage apparatus 1300 communicating with the processing apparatus 1100 through the system bus 1200. The storage apparatus 1300 is used to provide additional storage space for the electronic device, for example, for storing data and/or instructions other than sensitive information.

The electronic device 1000 may also be coupled to an input/output apparatus 1400 through the system bus 1200. In some embodiments, the input/output apparatus 1400 may provide a user interface in response to a user operation. Information provided or acquired by the input/output apparatus 1400 based on the user operation may be stored in the storage apparatus 1300 and/or the processing apparatus 1100 under the control of the processing apparatus 1100. Generally, the sensitive information (such as fingerprint information and property data) provided by the input/output apparatus 1400 may be processed in a TEE established by the processing apparatus 1100.

The input/output apparatus 1400 may include a display device to display information that the user needs to know. The display device is, for example, a cathode ray tube (Cathode Ray Tube, CRT for short) display, a liquid crystal display (Liquid Crystal Display, LCD for short), or an organic light-emitting diode (Organic Light-Emitting Diode, OLED for short) array display. In some embodiments, the input/output apparatus 1400 may include an input device such as a keyboard, a mouse, and a touch panel, used to transmit information corresponding to the user operation to the processing apparatus 1100 and/or a corresponding co-processor through the system bus 1200, such that the processing apparatus 1100 and/or the co-processor can respond to the user operation. In some embodiments, the input/output apparatus 1400 may include an acquisition device. The acquisition device may be coupled to the system bus 1200 to transmit instructions and data related to acquirable information such as images/sound. The acquisition device is, for example, a microphone and/or a device for acquiring images such as a camcorder or a camera.

The electronic device 1000 may include one or more interfaces 1500 integrated into the processing apparatus 1100 or coupled to the processing apparatus 1100 via the system bus 1200, such as a network interface. The electronic device 1000 may access a network via the network interface and a corresponding communication module. The network is, for example, a local area network (LAN), a wide area network (WAN), a metropolitan area network (MAN), a personal area network (PAN), Bluetooth, a cloud network, a mobile network (such as a long term evolution (Long Term Evolution, LTE) network, a 3G network, a 4G network, or a 5G network), an Intranet, or the Internet. The network interface may include a wireless network interface having at least one antenna and/or a wired network interface for communication over a network cable. The network cable may be an Ethernet cable, a coaxial cable, an optical fiber cable, a serial cable, or a parallel cable.

The network interface may, for example, provide access to a LAN based on IEEE 802.11b and/or 802.11g standards, or provide access to a personal area network based on Bluetooth standards, or support other wireless network interfaces and/or protocols, including existing communication standards and future communication standards. The network interface may also use time division multiple access (TDMI) protocols, global system for mobile communications (GSM) protocols, code division multiple access (CDMA) protocols, and/or other types of wireless communications protocols.

It should be noted that the above description and FIG. 1 are only used for exemplary description of the electronic device 1000, but not intended to limit a specific implementation of the electronic device 1000. The electronic device 1000 may also include other components, such as a digital signal processor (Digital Signal Processor, DSP). The components in the electronic device 1000 described above may also be omitted suitably in practical applications.

As an example, the electronic device 1000 shown in FIG. 1 is, for example, the refrigerator 1000' shown in FIG. 2. In the example shown in FIG. 2, the input/output apparatus 1400 includes, for example, a display touchscreen, an image acquisition apparatus, and the like. The processing apparatus 1100 may obtain, based on the image acquisition program, user's facial image data collected by the image acquisition apparatus, run a face recognition program based on the image data acquired by the image acquisition apparatus, and run a push program based on a face recognition result to push information (for example, including food items frequently purchased, relevant purchase links, and the like) related to historical records of the current user to the display touchscreen. The user may acquire information provided by a network 3000 by operating the display touchscreen, may directly configure the processing apparatus 1100 in the refrigerator 1000' by operating a mobile terminal device 2000 (for example, a smartphone), or configure the processing apparatus 1100 in the refrigerator 1000' over the network 3000, and may also view information returned to the mobile terminal device 2000 by the processing apparatus 1100.

In the example in FIG. 2, the processing apparatus 1100 may also run a face-scanning payment program to complete an online payment process based on facial image data provided by the user.

In some application scenarios, the application program involving sensitive information needs to transmit data to other application programs, so that subsequent application programs can proceed to implement corresponding functions based on received data. For example, in the example in FIG. 2, an image acquisition program needs to provide facial image data containing sensitive information to a facial recognition program, and the facial recognition program needs to provide a facial recognition result involving sensitive information to a face-scanning payment program and/or a push program. In the scenarios involving sensitive information, the process of data transmission between different application programs needs to have relatively high security and efficiency, so as to meet performance requirements while protecting sensitive information from being stolen.

Processing Apparatus

The processing apparatus 1100 in this embodiment of the present disclosure is configured to establish and control a plurality of TEEs capable of providing a security protection function. For each TEE, an instruction cannot access the TEE without its permission, and a program running within the TEE may not interfere with by a regular operating system and/or other TEEs, so that instructions and/or data running in different TEEs can be protected separately in the respective TEEs for higher security, privacy, and integrity.

Figure 3:
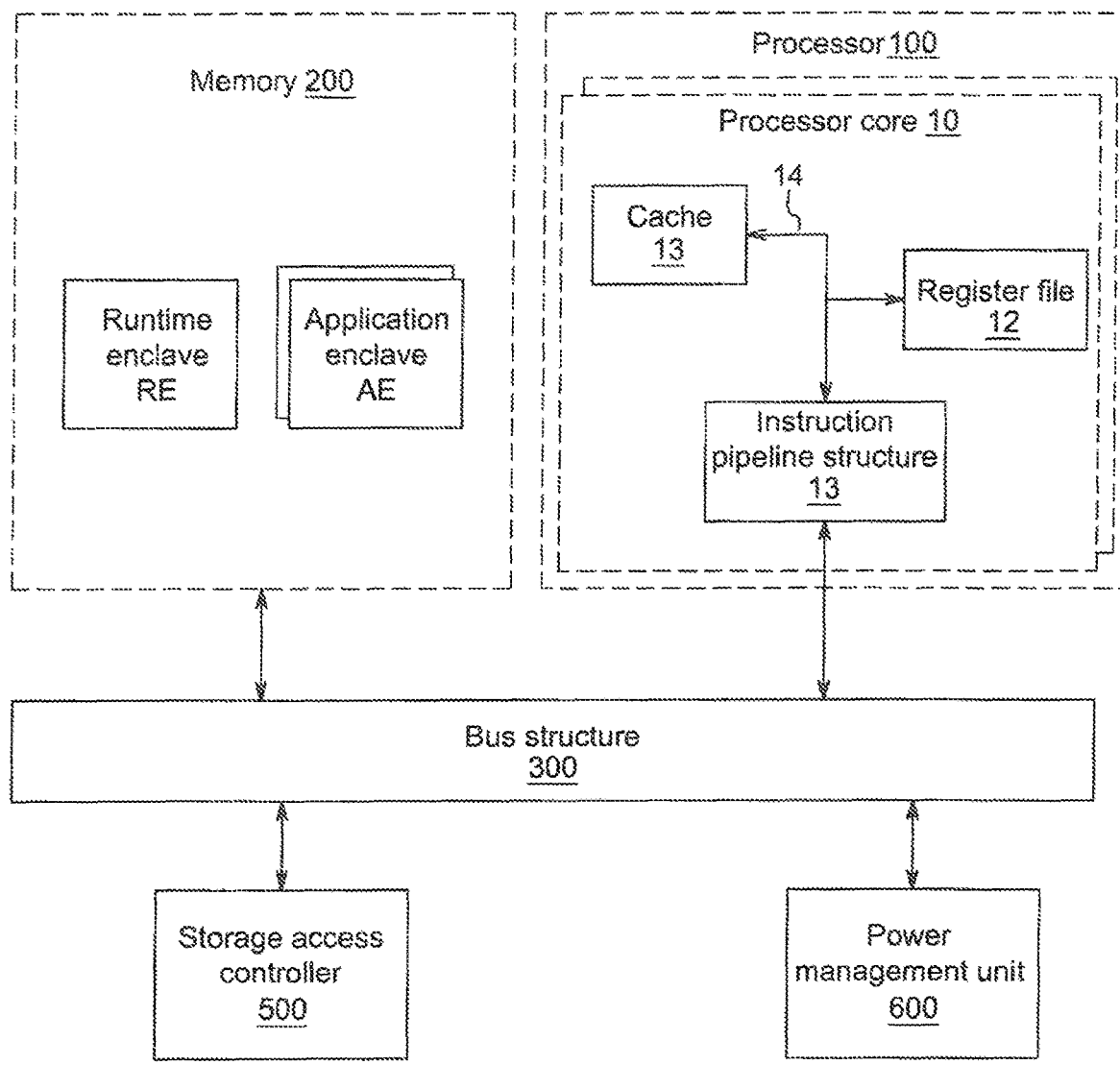
FIG. 3 is a schematic block diagram of a processing apparatus 1100 according to an embodiment of the present disclosure.

FIG. 3 is a schematic block diagram of a processing apparatus 1100 according to an embodiment of the present disclosure. It should be noted that, in the example described in this embodiment, at least a portion of the processing apparatus 1100 is integrated in the system-on-chip (or a single chip), and is implemented through cooperative work of a hardware architecture and a software architecture. However, the processing apparatus 1100 in this embodiment of the present disclosure may also include other portions coupled to the system-on-chip, that is, the processing apparatus 1100 is not limited to be implemented by the single chip or the system-on-chip, and may also be implemented by a plurality of components coupled through cables and/or circuits on the PCB.

As shown in FIG. 3, the processing apparatus 1100 may include a processor 100 used for processing data and instructions, and the processor 100 may include one or more processor cores 10. There may be a specific instruction set integrated in each processor core 10. In some embodiments, the instruction set may, for example, support complex instruction set computing (Complex Instruction Set Computing, CISC), reduced instruction set computing (Reduced Instruction Set Computing, RISC), or very long instruction word (Very Long Instruction Word, VLIW)-based computing. Different processor cores 10 may each process a different instruction set. In some embodiments, one or more processor cores 10 may also be other processing modules, for example, a digital signal processor.

In some embodiments, the processor 100 may include one or more caches 13, and depending on different architectures, the cache 13 may include a single or multi-level internal cache located inside and/or outside each processor core 10, or may include a cache shared by components (for example, different processor cores 10) in the processor 100. Furthermore, the cache 13 may include an instruction-oriented instruction cache and a data-oriented data cache.

Each processor core 10 may execute an instruction based on an instruction pipeline. Instruction pipelining is an instruction processing method to increase efficiency by dividing a processing process of an instruction into multi-stage instruction operations such as fetch (Fetch), decode (Decode), execute (Execute), memory access (Memory Access), and retire (Retire), with each stage instruction operation being implemented by a dedicated unit. As shown in FIG. 3, in order to process an instruction, each processor core 10 may include an instruction pipeline structure 11 implemented through cooperative work of software and hardware. The instruction pipeline structure 11 may include: a fetch unit for fetching an instruction, a decode unit for decoding the instruction into an executable format, an execute unit for executing the instruction, a memory access unit for accessing a corresponding storage area based on the instruction (may also be considered as an execute unit), and a retire unit for removing a related scheduling process after the execution of the instruction is complete. In some embodiments, the instruction pipeline structure implements two- or more-stage instruction operations. For example, instruction processing may be implemented only by the fetch unit and the execute unit, or instruction processing may be partly implemented by the fetch unit, the decode unit, and the execute unit.

In some embodiments, each processor core 10 may further include a register file 12 and an intra-core interconnect structure 14. The register file 12 may include one or more physical registers. Information stored in each physical register may indicate: one or more data types (such as scalar integer, scalar floating point, packed integer, packed floating point, vector integer, and vector floating point), status (such as access permission information), address (such as a pointer or an address for fetching an instruction), and other information. Inside each processor core 10, the intra-core interconnect structure 14 may implement interconnection between components of the processor core 10 (for example, the register file 112 may provide a pointer for fetching an instruction to the fetch unit through the intra-core interconnect structure 14), and may also couple the components inside the processor core 10 to a bus structure 300 outside the processor core 10.

It should be noted that the present disclosure is only used for example description of one of the processors 100, but not intended to limit a specific implementation of the processor 100. The components in the processor 100 described above may also be omitted suitably in practical applications. In some embodiments, other processors not shown may also be integrated in the processing apparatus 1100.

As an example of the processing apparatus 1100, the processor core 10 shown in FIG. 3 may be used to run an application program. The processor core 10 may be implemented based on a RISC-V instruction set architecture, and may also support some specified-function-oriented extended instruction sets. However, the embodiments of the present disclosure are not limited thereto. Each processor core 10 integrated in the processing apparatus 1100 may be implemented based on other instruction set architectures established by using a storage protection mechanism and controlling a plurality of TEEs. The processing apparatus 1100 may include one or more processor cores 10. Different processor cores 10 may be implemented based on different instruction set architectures.

Further, as shown in FIG. 3, the processing apparatus 1100 further includes a memory 200 for storing data information and code information. The memory 200 may include a storage structure such as a random access memory and a read only memory (Read Only Memory, ROM for short). The random access memory in the memory 200 may be used for running a program, and may, for example, include a non-volatile random access memory (Non-Volatile Random Access Memory, NVRAM for short), or may include storage structures such as a volatile dynamic random access memory (Dynamic Random Access Memory, DRAM for short) and/or a static random access memory (Static Random Access Memory, SRAM). The ROM in the memory is, for example, implemented by a structure such as a flash memory (FLASH Memory), and is mainly used for storing code information and instruction information. As an example, the processor 100 may access the ROM to acquire code information and instruction information, and implement data storage and/or read/write by accessing the random access memory, so that the processor 100 can implement program running based on a storage space provided by the memory 200.

In some optional embodiments, the memory 200 may further include an MIMO (Memory-mapped I/O, memory-mapped input/output interface) for coupling to a storage apparatus outside the processing apparatus 1100, so that the storage apparatus and the memory 200 can jointly provide a storage space accessible to the processor 100.

For ease of description, a storage space accessible to the processor 100 is collectively called as a storage unit of the processing apparatus 1100 in the present disclosure. Just as described above, in terms of physical structure, the storage unit of the processing apparatus 1100 may be implemented by the memory 200 integrated in the processing apparatus and/or a storage apparatus coupled to the processing apparatus 1100 via the MIMO. In some embodiments, storage addresses corresponding to the storage unit of the processing apparatus 1100 may belong to a same addressing space for access by the processor 100.

In this embodiment of the present disclosure, the storage unit may include a plurality of enclaves 20 (which may be referred to as Enclave or Secure Enclave, or referred to as partition, trusted zone, enclave, enclosure, or secure environment), and each enclave is equivalent to an independent trusted execution environment TEE. It should be noted that, although the enclaves shown in FIG. 1 and FIG. 3 are drawn inside the memory 200, just as described above, in some optional embodiments, at least a part of an enclave 20 or some enclaves 20 may alternatively be implemented by the storage apparatus 1300 coupled to the MIMO.

A physical structure that each enclave 20 is based on may be implemented by any one or more storage structures in the storage unit. For example, an enclave 20 for running a program may include: a first storage area provided by a ROM and used for storing code of the program in the storage unit, a second storage area provided by an NVRAM and used for storing required data of the program in the storage unit, and/or a third storage area mapped by the MMIO.

As shown in FIG. 3, the processing apparatus 1100 further includes a bus structure 300, so that the memory 200 communicates with the processor 100 via the bus structure 300. The bus structure 300 is, for example, an SoC bus, and may be implemented based on a bus protocol such as AXI (Advanced eXtensible Interface).

As shown in FIG. 3, the processing apparatus 1100 further includes a storage access controller 500 used for directly accessing a storage unit to obtain information (data and/or code) stored therein, and managing data transmission inside the electronic device. The storage access controller 500 is coupled to the bus structure 300, so that both the processor 100 and the memory 200 can be coupled to the storage access controller 500 through the bus structure 300. The processor 100 may initialize the storage access controller 500, so that the storage access controller 500 can obtain a control right of the bus structure 300 in response to a transmission request. Then the storage access controller 500 may issue a read/write command or the like to establish an information transmission path indicated by the transmission request, so that information transmission can be implemented between components within the processing apparatus 1100 such as the processor cores 10 and storage areas in the storage unit when permission allows; and return the control right of the bus structure to the processor 100 after completion of the information transmission, and wait for a next initialization. In some specific embodiments, the storage access controller 500 may be a DMA controller, a controller including a DMA controller, or other controllers that can provide an information transmission path without being controlled by a processor.

The processing apparatus 1100 may further include: a bridge for bridging the bus structure 300 and a system bus 1200 of the electronic device, a power management unit (Power Management Unit, PMU for short) 600, a non-volatile memory or a random access memory for providing an additional storage space, and an interface module for connecting to peripheral apparatuses such as a disk and a sensor, and may also include various analog components (such as an analog-digital converter, a digital control amplifier, a phase-locked loop, a transmitting/receiving module, and a radio frequency module), various digital components (such as an image processor, an audio processor, and an accelerator), and other hardware components described or not described above.

As described above, because the process of processing instructions and information is implemented by the processor 100, the user can control the operating system by using an application program, such that the processor 100 can acquire corresponding instructions and information from the storage unit under the control of the operating system, and complete processing of the instructions and information. A processing result can be also stored into the storage unit.

Figure 4:
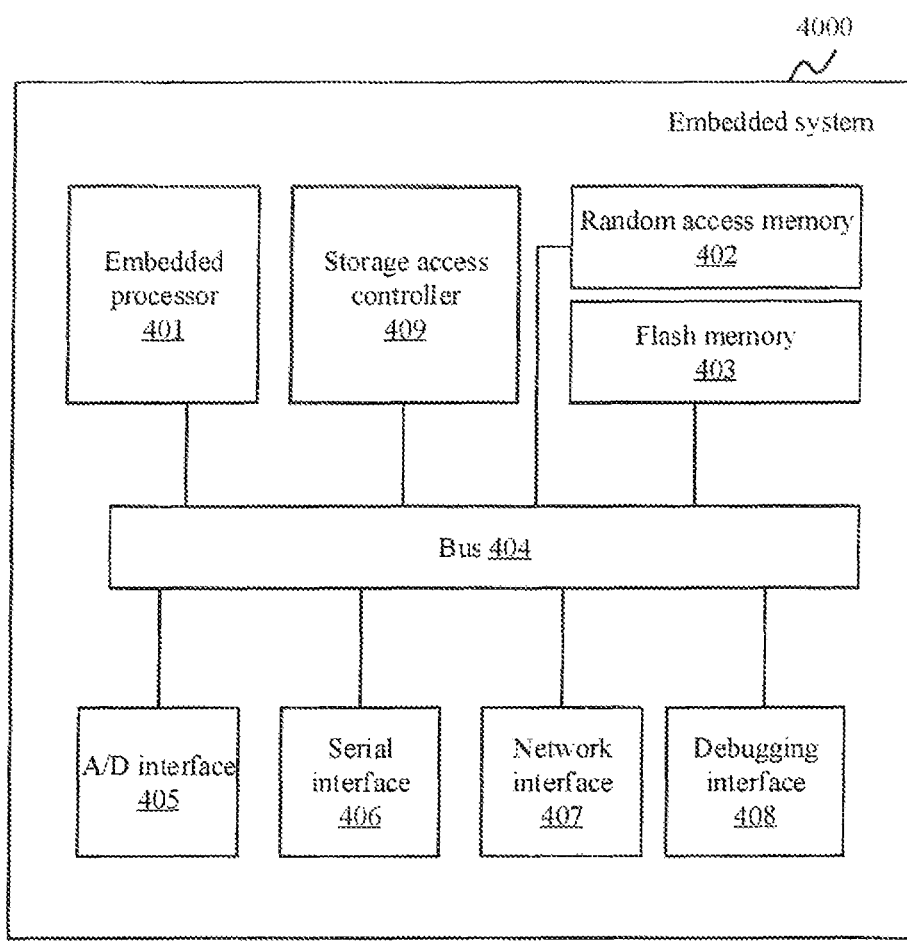
FIG. 4 is a system architectural diagram of an embedded system 4000 applied to an embodiment of the present disclosure.

FIG. 4 is a system architecture diagram of an embedded system 4000 according to an embodiment of the present disclosure. The embedded system 4000 can implement the processing apparatuses in the embodiments of the present disclosure.

Although functions, appearance screens, operations, and the like of various specific embedded systems are different or even have a tremendous difference, the basic hardware structure is identical with only minor differences, and has a high degree of similarity as a hardware system of a general-purpose computer. However, due to application characteristics of the embedded systems, the embedded systems greatly differ from the general-purpose computer systems in the hardware composition and implementation.

First, in order to meet the requirements of the embedded system 4000 in terms of speed, size, and power consumption, data that needs to be stored for a long time, such as the operating system, application software, and special data, usually does not use large-capacity and slower storage media such as disks, but mostly use a random access memory 402 or a flash memory (Flash Memory) 403, as shown in FIG. 4. Based on the description of any one of the embodiments of the present disclosure, the flash memory 403 is, for example, a cache in the processing apparatus, and the random access memory 402 is, for example, a storage unit including a plurality of enclaves in the embodiments of the present disclosure.

In addition, the embedded system 4000 requires an A/D (analog/digital conversion) interface 405 and a serial interface 406 for measurement and control, which are rarely used in the general-purpose computers. The A/D interface 405 mainly implements conversion of analog signals to digital signals and conversion of digital signals to analog signals as required during testing. The embedded system 4000 usually requires testing when being used in industrial production. During testing, digital signals generated by a single-chip microcomputer need to be converted into analog signals for testing, and therefore, unlike the general-purpose computer, the A/D interface 405 needs to perform related conversion. In addition, in the industry, a plurality of embedded systems usually need to be connected in series to implement related functions. Therefore, the serial interface 406 for connecting the plurality of embedded systems in series is required, which is mostly not required by the general-purpose computer.

In addition, the embedded system 4000 serves as a basic processing unit, and a plurality of embedded systems 4000 usually need to be connected into a network in industrial design. Therefore, a network interface 407 for connecting the embedded system 4000 to the network is required. This is mostly not required in the general-purpose computer. In addition, depending on actual applications and scales, some embedded systems 4000 require a bus 404 (which is, for example, implemented by using the bus structure and/or system bus in the foregoing embodiments). With rapidly increasing application fields of the embedded system 4000, the embedded system 4000 tends to be more customized, and more types of buses are used depending on characteristics of the embedded system. In addition, to test internal circuits of an embedded processor 401, a boundary scan test technology is usually used for a processor chip. To accommodate this test, a debugging interface 408 is used.

Figure 5:
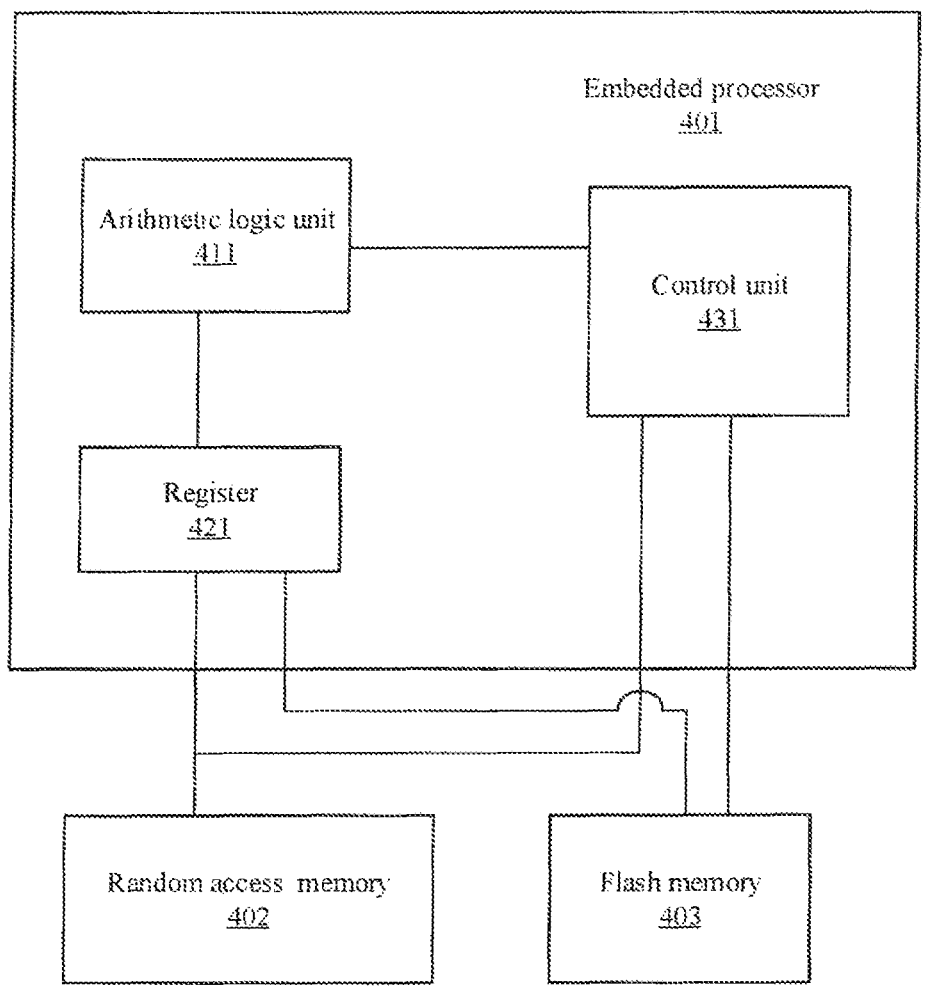
FIG. 5 is a structural diagram of an embedded processor 401 according to an embodiment of the present disclosure.

A processing core of the embedded system 4000 is the embedded processor 401 (used to implement the processor of the processing apparatus in the embodiments of the present disclosure). FIG. 5 is a structural diagram of the embedded processor 401 according to an embodiment of the present disclosure. The embedded processor 401 includes an arithmetic logic unit (ALU) 411, a register 421, and a control unit 431. The arithmetic logic unit 411 implements actual arithmetic processing. The register 421 is configured to store instructions during operation processing, intermediate results during operation processing, and so on. The control unit 431 controls access to the external RAM 402 (the memory for providing a plurality of enclaves disclosed in the foregoing embodiment) and the flash memory 403 (the cache disclosed in the foregoing embodiment).

During execution of a to-be-executed instruction, the ALU 411 transfers the to-be-executed instruction from the random access memory 402 or the flash memory 403 to the register 421, and receives a next instruction fetch address or acquire, through computation, a next instruction fetch address based on an instruction fetch algorithm. The instruction fetch algorithm includes, for example, progressively incrementing an address or progressively decrementing an address based on an instruction length.

After the instruction is fetched, the ALU 411 enters an instruction decoding stage. The ALU 411 decodes the fetched instruction based on a predetermined instruction format to acquire operand acquisition information required for the fetched instruction, to prepare for instruction execution. The operand acquisition information points to, for example, an address and the like in the random access memory 402 or the flash memory 403. After decoding, the ALU obtains, based on the operand acquisition information, operands stored in the random access memory 402 or the flash memory 403, and implements execution processing.

During execution of a specific type of instruction (such as a memory access instruction), the ALU 411 needs to access the random access memory 402 or the flash memory 403 to obtain information stored therein or provide data that needs to be written into the random access memory 402 or the flash memory 403.

After the memory access instruction is acquired by the ALU 411, the ALU 411 may perform decode processing on the memory access instruction, so as to acquire a source operand of the memory access instruction. The ALU 411 can perform corresponding operations on the source operand of the memory access instruction (for example, the arithmetic logic unit performs operations on the source operand stored in the register) to obtain address information corresponding to the memory access instruction, and initiate a corresponding request based on the address information, such as an address translation request or a write access request.

The source operand of the memory access instruction usually includes an address operand. The ALU 411 performs operations on the address operand to obtain a virtual address corresponding to the memory access instruction. The ALU 411 initiates an address translation request to the control unit 431 based on the virtual address, and the address translation request includes the virtual address corresponding to the address operand of the memory access instruction. The control unit 431 responds to the address translation request, and converts the virtual address in the address translation request into a physical address based on an entry matching the virtual address, so that the ALU 411 can access the random access memory 402 or the flash memory 403 based on the translated physical address.

Depending on different functions, the memory access instruction may include a load instruction and a store instruction. Execution of the load instruction usually does not need to modify information in the random access memory 402 or the flash memory 403. The ALU 411 merely needs to read, based on an address operand of the load instruction, data in the random access memory 402, the flash memory 403, or an external storage device.

Different from the load instruction, a source operand of the store instruction includes not only an address operand but also data information. During execution of the store instruction, the random access memory 402 or the flash memory 403 usually needs to be modified. The data information of the store instruction may point to write data, and a source of the write data may be an execution result of an operation instruction, a load instruction, or other instructions, or data in the register 421, or an immediate.

Based on an embodiment of the present disclosure, the embedded system 4000 further includes a storage access controller 409 in any one of the embodiments of the present disclosure. The storage access controller 409 is configured to directly access the storage unit to obtain information stored therein, and manage data transmission within the embedded system. For example, the storage access controller 409 is coupled to the bus 404 of the embedded system, so that both the embedded processor 401 and the random access memory 402 can be coupled to the storage access controller 409 through the bus 404. The embedded processor 401 may perform initialization configuration on the storage access controller 409, and the configured storage access controller 409 may establish a secure channel between different enclaves, so that a process of data transmission between different enclaves does not require transferring through the embedded processor 401, thereby reducing power consumption of the inter-enclave data transmission process, ensuring that data transmitted between the enclaves is not stolen, and improving efficiency of inter-enclave data transmission.

It should be noted that FIG. 4 and FIG. 5 are merely possible examples of the embedded system in the embodiments of the present disclosure. In some other examples, the embedded system of the present disclosure may also include some parts (such as a sensor) not shown, and parts already shown may also be omitted (for example, in applications that do not require networking, the network interface may be omitted).

Figure 6:
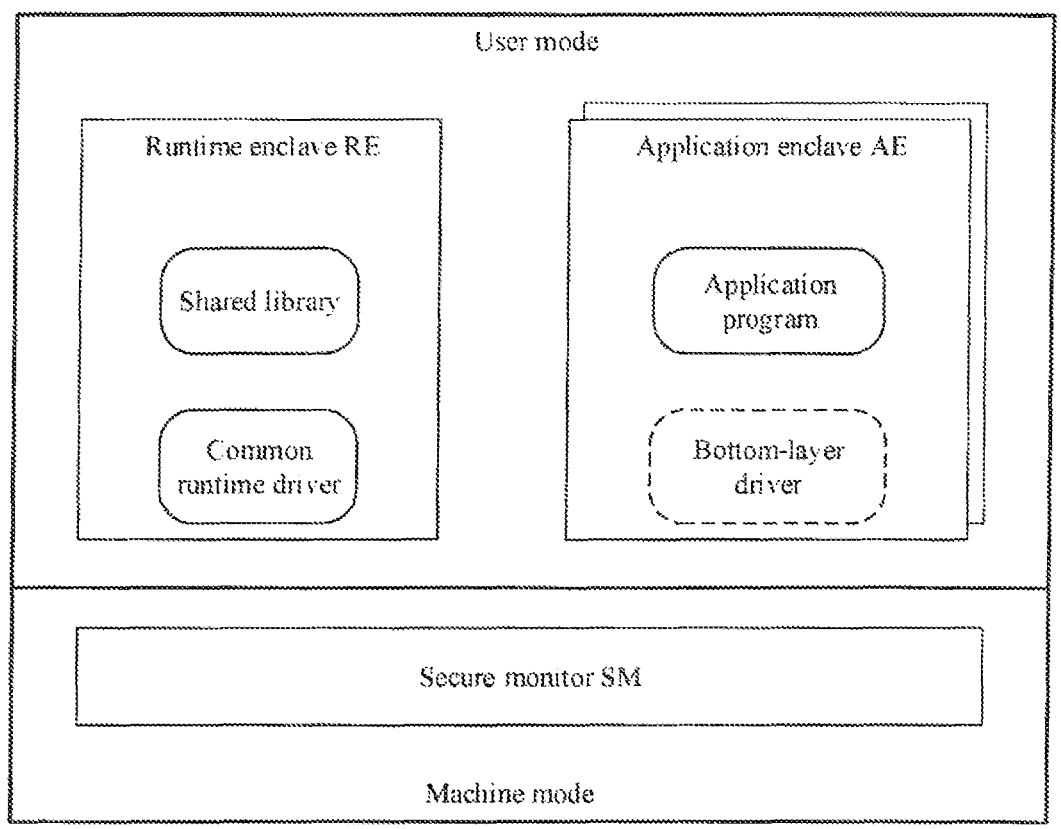
FIG. 6 is a schematic diagram of a software architecture of a processing apparatus according to an embodiment of the present disclosure.

FIG. 6 is a schematic diagram of a software architecture of a processing apparatus according to an embodiment of the present disclosure.

Based on the foregoing hardware architecture, an operating system may run on the processing apparatus 1100 provided in the embodiments of the present disclosure. The operating system may be used to: control, manage, and schedule access to hardware resources (including the memory, the processor, the storage apparatus, and/or other external devices) in the electronic device; and provide corresponding interfaces (such as a system call interface, System Call Interface) for various application programs. A user and/or an application program can initiate access to the operating system through the corresponding interface to request the operating system to provide corresponding service support (for example, controlling a hardware architecture), such that the processing apparatus 1100 can perform different tasks based on various application programs.

In this embodiment of the present disclosure, an instruction set (such as an RISC-V instruction set) architecture that the processor 100 is based on may define a plurality of right modes (also known as privileged mode, Privileged Mode), including at least user mode (User Mode, U-mode for short) and machine mode (Machine Mode, M-mode for short, or kernel mode).

In some optional embodiments, the processing apparatus 1100 may also include supervisor mode (Supervisor Mode, S-mode for short), hypervisor mode (Hypervisor Mode, H-mode for short), and other modes, to implement different functions based on different scenarios.

In some embodiments, for example, the processing apparatus 1100 includes a mode status register (which is, for example, located in a register file 12 or implemented by another register located within a processing unit) for providing operation codes corresponding to different right modes. The processing apparatus 1100 may determine whether a current instruction can be executed in the current right mode by viewing the operation codes, thereby implementing functions, such as task processing, task protection, hardware abstraction, and visualization, in different right modes.

To prevent an untrusted application program from obtaining sensitive information, various application programs can run only in protected user mode, neither affecting running of the operating system or having permission that affects various configurations of machine mode. The operating system can manage and control application programs, and software and hardware resources within other electronic devices. The operating system is run at least in application mode, and in some optional embodiments, the operating system may be also run in machine mode.

Machine mode may be understood as a trusted mode. In machine mode, the processing apparatus 1100 may run a trusted secure monitor (Secure Monitor, SM for short) in a specified storage area (different from the storage area of the operating system) of the storage unit. Code of the secure monitor is generally considered as trusted code by default (which may be stored in a read only memory within the memory). The secure monitor can access components within the electronic device such as the operating system in a trusted manner, and therefore can control the storage unit, an input/output interface, and some bottom-layer functions necessary for the boot and configuration processes of the electronic device. Because an application program generally includes untrusted code, the application program is unable to run in machine mode, and both the operating system and the application program have no right to access the secure monitor.

In this embodiment of the present disclosure, the secure monitor can implement a physical memory protection (Physical Memory Protection, PMP for short) mechanism that is used to specify in machine mode a storage address space that can be accessed in user mode, and grant or deny read permission, write permission, execute permission, and other permission.

Based on the PMP mechanism, in machine mode, the secure monitor may configure corresponding storage address spaces for a plurality of enclaves 20 isolated from each other (as shown in FIG. 1, FIG. 3, and FIG. 6). All or a part of the application programs may be loaded into a corresponding enclave 20 to isolate from other application programs and/or information. When the processor 100 needs to run an application program, the processor 100 may obtain, in one or more authorization modes (such as authentication and signature), code and/or data stored in the corresponding enclave 20, and return generated information to the enclave 20, implementing independent running of the application program.

For example, in the example shown in FIG. 2, an image acquisition program may run independently in a first enclave, an image acquisition apparatus returns collected facial image data to the first enclave. A facial recognition program may run independently in a second enclave, and the first enclave needs to transmit the facial image data to the second enclave, so that the facial recognition program can obtain, through computation, a facial recognition result based on the facial image data. A face-scanning payment program may run independently in a third enclave, and the second enclave needs to transmit the facial recognition result to the third enclave, so that the face-scanning payment program can implement a payment operation based on the facial recognition result. It can be learned that in some application scenarios, data transmission may need to be performed between application programs running in different enclaves, and in this embodiments of the present disclosure, efficient and secure data transmission between different enclaves can be implemented based on the memory access controller 500.

In some embodiments, the secure monitor is also used to implement process switching between programs running in the enclaves 20, or may be used to implement processes switching between programs running in the enclaves 20 and other programs (such as the operating system). For example, after code in an enclave is run by a corresponding processor core, the enclave may transfer a control right to the secure monitor, and the secure monitor then transfers the control right to code running in another enclave, so as to start another application program.

The following describes different enclaves in the embodiments of the present disclosure.

Enclave

As shown in FIG. 3 and FIG. 6, in the processing apparatus in the embodiments of the present disclosure, the processor 100 divides enclaves of different functions in an address space of the storage unit, including but not limited to: a plurality of application enclaves (Application Enclave, AE for short, or other names) AEs for application programs and a non-application enclave for implementing security control.

Different enclaves defined in the embodiments of the present disclosure are described below.

Application enclave AE: is used to package a corresponding application program (generally specified as an application program involving sensitive information and/or a non-trusted application program), thereby isolating the application program from other programs/information in user mode. The application enclave AE stores, for example, executable code of the application program and data that can be obtained or generated by the application program. Different application programs (which may be a host application program and/or all or a part of a supplementary application programs) run in different application enclaves AEs.

Non-application enclave: a non-application enclave for security control of data transmission between different enclaves may be set in a storage address space in the embodiments of the present disclosure. For ease of description, such type of non-application enclave is referred to as a runtime enclave (Runtime Enclave, RE for short) in the present disclosure. However, the name "runtime enclave" should not constitute any limitation on the function and role of the non-application enclave, that is, the non-application enclave is alternatively called by other names. In some embodiments, the non-application enclave may also include an enclave for running other security control programs and/or an enclave having other functions. For example, the non-application enclave may also include a crypto enclave. The crypto enclave is used to provide a storage space required for running a password-related program.

A control program running in the runtime enclave RE may be used for secure control of the process of data transmission between different enclaves. In some embodiments, the runtime enclave RE may also be used to store shared information (for example, a shared programs and/or a generic driver) that can be invoked by different application programs, so as to save storage space. The shared information includes, for example, a shared library (shared library) and/or a shared driver. In some embodiments, the shared library includes, for example, a common runtime library (Runtime Library) for supporting development and running of an operating system (for example, providing various application programs with invokable library functions, initialization code, error handling code, and/or exit code), so that the shared library stored within the runtime enclave RE is invoked for running different application programs, without the need to store the same information repeatedly in the storage unit, thereby saving storage space. In some embodiments, for example, the shared driver includes a common runtime driver (Common Runtime Driver) for driving and configuring initialization, error handling, and exit procedures of different application programs.

To ensure security performance of the processing apparatus 1100, corresponding permission may be set (granted/denied) for different enclaves. As an example, permission information of the enclaves may be stored in corresponding permission registers (for example, implemented by the register file 12 specified by the processor 100, or may be implemented by other registers located within the processing apparatus 1100) or a specified area in the storage unit.

In the embodiments of the present disclosure, the application program running in the application enclave AE does not have read/write permission for the non-application enclave, to prevent information in the non-application enclave from being tampered with or affected by the application program, thereby ensuring that the information stored in the non-application enclave can be kept confidential and integral. In addition, the application program running in the application enclave AE may have execute permission for the non-application enclave, that is, the application program running in the application enclave AE can merely implement a corresponding function by invoking information (data and/or programs) in the non-application enclave.

Furthermore, in some embodiments, each application enclave AE does not have permission to read other application enclaves, thereby ensuring that information stored in each application enclave AE cannot be proactively read by other application enclaves, and ensuring information security.

In some scenarios (such as the example described above), because application programs running in different application enclaves may need to transmit necessary data, application programs running in the application enclave AE can proactively request to write necessary data into a storage space of another application enclave In some embodiments, the non-application enclave may have access permission for the application enclave AE, that is, a program running in the non-application enclave (for example, a security driver) can perform read, write, and execute operations in the application enclave AE.

Benefiting from the foregoing PMP mechanism, in an optional embodiment, a storage address range of each enclave may be stored as an item list in a set area of the storage unit and/or a specified register (which is, for example, implemented by a register file specified by the processor 100, or implemented by other registers located within the processing apparatus 1100). The item list can be accessed only by the secure monitor. The processor 100 implements address allocation of an enclave by configuring each entry (entry) in the configuration item list.

Each entry may have a set data structure. In some optional embodiments, in addition to an address tag (which may be stored in an address register) used for indicating a storage address range of a corresponding enclave, each entry may include a category tag used for indicating category information of the enclave (which is used to indicate that the enclave is an application enclave, a non-application enclave, a runtime enclave, or a crypto enclave), and/or a permission tag used for indicating the foregoing permission information. In some embodiments, each entry may also be used to indicate auxiliary information such as an enclave number.

Each entry may be stored in a protected area specified in the storage unit, and may be copied to a specified register (which is, for example, implemented by a register file specified by the processor 100, or implemented by other registers located within the processing apparatus) in the processing apparatus 1100.

Based on the PMP mechanism, the processing apparatus 1100 may protect each enclave at a physical level. For example, if an access request (which is, for example, initiated by an external device) has no permission to access an enclave, the processing apparatus marks the access request as referring to an unavailable storage address, so that the access request cannot be executed. For another example, before the processing apparatus 1100 fetches an instruction or executes a load/store operation based on an access address, the processing apparatus 1100 may compare the access address with a storage address range indicated by each entry in the item list, and determine, based on a comparison result, whether the access address is allowed. If yes, the processing apparatus 1100 may continue to perform a corresponding operation based on the access address; if no, an access fault is triggered.

Inter-Enclave Data Transmission Process

In the following description, a process of data transmission between two application enclaves (exemplarily referred to as a first application enclave AE1 and a second application enclave AE2 hereinafter, where the first application enclave AE1 is used as a source enclave for running a first application program App1, and the second application enclave AE2 is used as a target enclave for running a second application program App2) in a plurality of enclaves is mainly used as an example for description. In this example, at least one non-application enclave includes one runtime enclave RE (used for running a control program) for controlling the process of data transmission between the source enclave and the target enclave. However, just as described above, the embodiments of the present disclosure are not limited thereto. The storage address space may be configured with a plurality of non-application enclaves to implement a plurality of runtime enclaves and/or non-application enclaves with other functions. The runtime enclave RE may be adapted not only to run and store the control program, but also to run and/or store some other information. In some embodiments, the source enclave for providing specified data may be an application enclave, a crypto enclave, or other non-application enclaves, and the target enclave for receiving specified data may be an application enclave, a crypto enclave, or other non-application enclaves.

Figure 7:
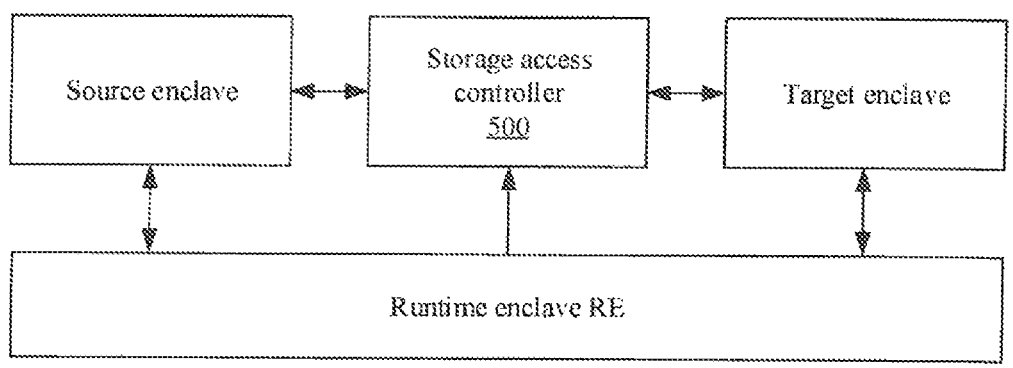
FIG. 7 is another schematic block diagram of a processing apparatus according to an embodiment of the present disclosure.
Figure 8:
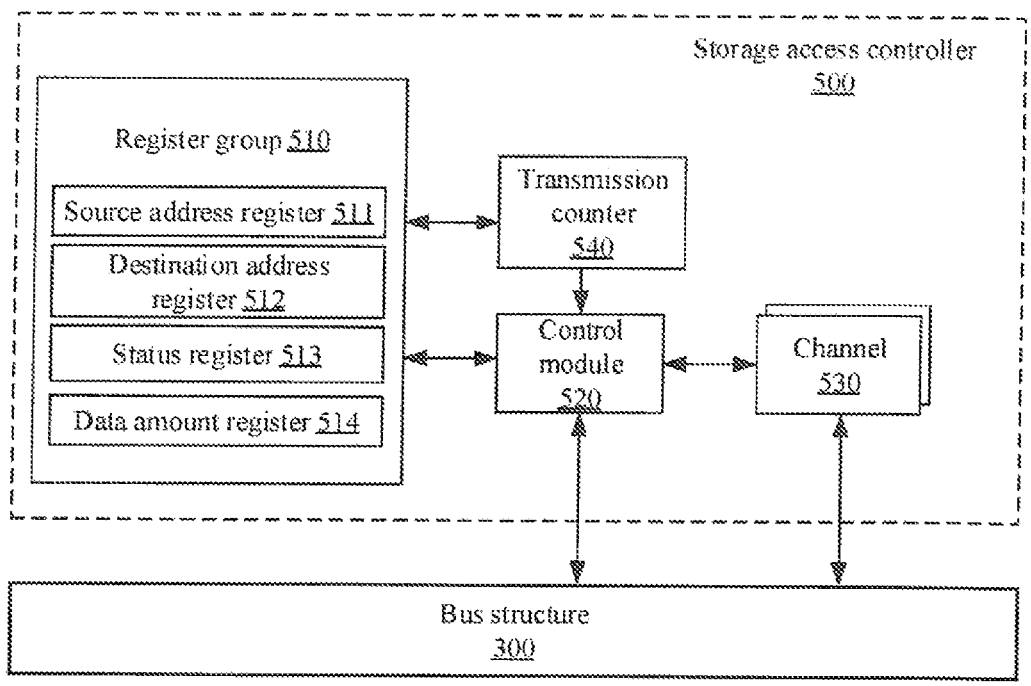
FIG. 8 is a schematic block diagram of a storage access controller according to an embodiment of the present disclosure.

FIG. 7 is another schematic block diagram of a processing apparatus according to an embodiment of the present disclosure. FIG. 8 is a schematic block diagram of a storage access controller according to an embodiment of the present disclosure. In order to more clearly illustrate how the processing apparatus in the embodiments of the present disclosure implements data transmission, one or some software/hardware components of the processing apparatus 1100 are shown drawn in FIG. 7, and one or some software/hardware components of the storage access controller 500 are not shown in FIG. 8. The embodiment shown in FIG. 7 may be implemented based on the storage access controller shown in FIG. 8 or a variant thereof.

As shown in FIG. 7 and FIG. 8, the first application program App1 running in the first application enclave AE1 provides a transmission request when data needs to be transmitted to the second application enclave AE2. The transmission request includes source address information (for example, a start physical address of data that needs to be transmitted) of specified data that needs to be transmitted, destination address information (used to point to the second application enclave, where the destination address information is, for example, a tag, a number, or a start physical address of the second application enclave AE2 that needs to receive the data) of the specified data that needs to be transmitted, and information about an amount of the data that needs to be transmitted (for example, a quantity of bytes of the data that needs to be transmitted).

The control program running in the runtime enclave RE may initiate, based on the transmission request, an allocation request (including at least the information about the amount of the data to be transmitted) to the second application program App2 running in the second application enclave AE2.

In some embodiments, initiators of transmission requests received by the control program may be inconsistent. Therefore, the control program may verify validity of the transmission requests based on a preset control rule to avoid active read operations between different application enclaves, thereby ensuring that information in the application enclaves is not leaked. If the control program determines that the transmission request is valid, the control program further generates an allocation request based on the transmission request; or if the control program determines that the transmission request is invalid, the control program rejects the transmission request to terminate data transmission indicated by the transmission request.

The control rule of the control program may include: determining whether a storage address corresponding to the source address information indicated by the transmission request is located in the source enclave (for example, the first application enclave AE1). If yes, it indicates that a program running in the source enclave (for example, the first application program App1) is the initiator of the transmission request, that is, the transmission request is not used to read/execute information in other enclaves, and the request is valid in this case; if not, it indicates that the initiator of the transmission request is not the program running in the source enclave, that is, the transmission request is used to access data stored in the source enclave from outside the source enclave, which may lead to malicious acquisition of sensitive information stored in the source enclave, and therefore in this case, the control program in the embodiments of the present disclosure determines that the transmission request is invalid.

In some optional embodiments, one or more control rules may be preset for the control program running in the runtime enclave RE, and are not limited to the foregoing control rule. For example, one of the control rules of the control program may include: for a transmission request initiated by a program running in a specified enclave or some specified enclaves, the control program can directly reject the transmission request, with no need to determine a transmission direction. For another example, one of the control rules of the control program may include: the control program prohibits an application program running in one or some specified enclaves from initiating a transmission request. For example, the control program may prohibit an application enclave for running a payment application program from initiating a transmission request, so as to ensure that payment information is securely protected.

When the control program initiates an allocation request to the target enclave (for example, the second application enclave AE2), the allocation request initiated by the control program is sent to the target enclave (for example, the second application enclave AE2) to which the transmission request points. Then, the program (for example, the second application program App2) running in the target enclave determines, based on the allocation request, whether an assignable address space in the target enclave is large enough to match the data amount information indicated by the allocation request. If yes, the second application program App2 returns an allocation success notification (transmission acknowledgement response) to the control program. The allocation success notification includes at least allocated address information (for example, address information such as a start physical address of a free storage area in the target enclave, where the free storage area is used as a target storage area for storing the specified data during the current transmission) for indicating that the target enclave can be used to store to-be-transmitted data. If not, the program running in the target enclave returns an allocation failure notification to the control program, so that the control program terminates the current transmission in response to the allocation failure notification.

After receiving the allocation success notification, the control program provides initialization information to the storage access controller based on the allocation success notification, to complete the initialization setting of the storage access controller. The initialization information includes at least the source address information and data amount information that are indicated by the transmission request, the allocated address information indicated by the allocation success notification, and so on.

The initialized storage access controller 500 may establish, based on the initialization information, a secure channel for unidirectional transmission, to transmit (which may be understood as copy) the specified data in the source enclave (corresponding to the source address information and the to-be-transmitted data amount information that are indicated by the transmission request) to the target storage area (corresponding to the allocated address information indicated by the allocation success notification) in the target enclave.

In addition, because the processor 100 and the storage access controller 500 cannot control the bus structure 300 simultaneously, provision of the initialization information by the processor 100 to the storage access controller 500 means that the control right of the bus structure 300 needs to be transferred from the processor 100 to the storage access controller 500.

In some embodiments, after receiving the initialization information, the storage access controller 500 may initiate a takeover request to the processor 100, so that the storage access controller 500 can obtain the control right of the bus structure 300 after the processor 100 returns a takeover permission signal to the storage access controller 500. In some other embodiments, the processor 100 may also release the control right of the bus structure 300 at the time of providing the initialization information (or within a period of time after or within a period of time before the initialization information is provided) (in this case, for example, the bus structure 300 presents a high-impedance state to the processor 100), so that the storage access controller 500 can establish a data transmission channel through the bus structure 300. The storage access controller 500 may determine whether the current transmission is completed, and if determining that the current transmission is completed, returns the control right of the bus structure 300 to the processor 100.

In order to implement the foregoing function, as shown in FIG. 8, the storage access controller 500 may include: a register group 510, a control module 520, and at least one channel 530.

In some embodiments, the register group 510 may include a source address register 511 and a destination address register 512. After the storage access controller 500 completes the initialization setting, the source address register 511 is used to store the source address information provided by the initialization information to indicate a location of the to-be-transmitted specified data in the source enclave, and the destination address register 512 is used to store the allocated address information indicated by the allocation success notification (that is, information about a to-be-written-into address in the target enclave) to indicate a storage location (that is, the target storage area), of the specified data that needs to be transmitted in the current transmission, in the target enclave.

The control module 520 is used to select an available channel from at least one channel 530 as a secure channel, and the secure channel is coupled through a specified interface and the bus structure 300 to a hardware structure used for implementing the storage unit, so as to transmit the to-be-transmitted specified data stored in the source enclave to the target storage area in the target enclave through the secure channel, implementing the purpose of the transmission request.

In some embodiments, the register group 510 further includes a status register 513 for providing a status value corresponding to each channel 530, to indicate whether each channel 530 is in an available state. Based on the status value provided by the status register 513, the control module 520 may select one of the channels 530 in the available state as the secure channel, and update a status value of the secure channel to an occupied state, to prevent a transmission collision.

In some embodiments, the storage access controller 500 may further include a transmission counter 540, and the register group 510 may further include a data amount register 514. After the storage access controller 500 completes the initialization setting, the data amount register 514 stores the data amount information provided by the initialization information to indicate a length of the to-be-transmitted data in the current data transmission, and the data length is, for example, a quantity of bytes to be transmitted. The transmission counter 540 is used to perform counting on transmitted data during the current data transmission to obtain a cumulative transmission length, so that when the cumulative transmission length is equal to the data length indicated by the data amount register 514, the transmission counter 540 and/or the control module 520 can learn that all the data that needs to be transmitted this time has been transmitted.

After the data transmission is completed, the control module 520 may send a transmission end notification to the processor through the bus structure 300, so that the control right of the bus structure 300 is restored for the processor.

In some embodiments, the storage access controller 500 may also include several counters, registers, and/or calculation modules that are not shown. For example, each byte of the transmitted data needs to be written into a continuous address in the target enclave. Therefore, the storage access controller 500 may also include the calculation module for calculating an address into which a next byte needs to be written, and based on an address obtained through calculation, updates the allocated address information stored in the destination address register 512, so that the address information stored in the destination address register 512 points to a next writable byte unit in the target storage area. For another example, the storage access controller 500 may further include an interface unit that matches the bus structure 300, so that structures such as the control module 520 and the channel 530 can interact with the bus structure 300 correctly.

According to the various embodiments described above, the processing apparatus and the electronic device provided by the present disclosure may allocate mutually isolated enclaves to different programs, so that different programs can run independently in different enclaves; and the storage access controller may establish a unidirectional data transmission channel between the source enclave and the target enclave, so that the process of data transmission between the source enclave and the target enclave does not require involvement of the processor, thereby implementing an efficient and secure data transmission process. In some embodiments, the control program running in the runtime enclave may use one of the channels specified in the storage access controller as the secure channel, and the specified secure channel may be used between the source enclave and the target enclave to implement unidirectional data transmission, further ensuring security of the process of data transmission between different enclaves.

Figure 9:
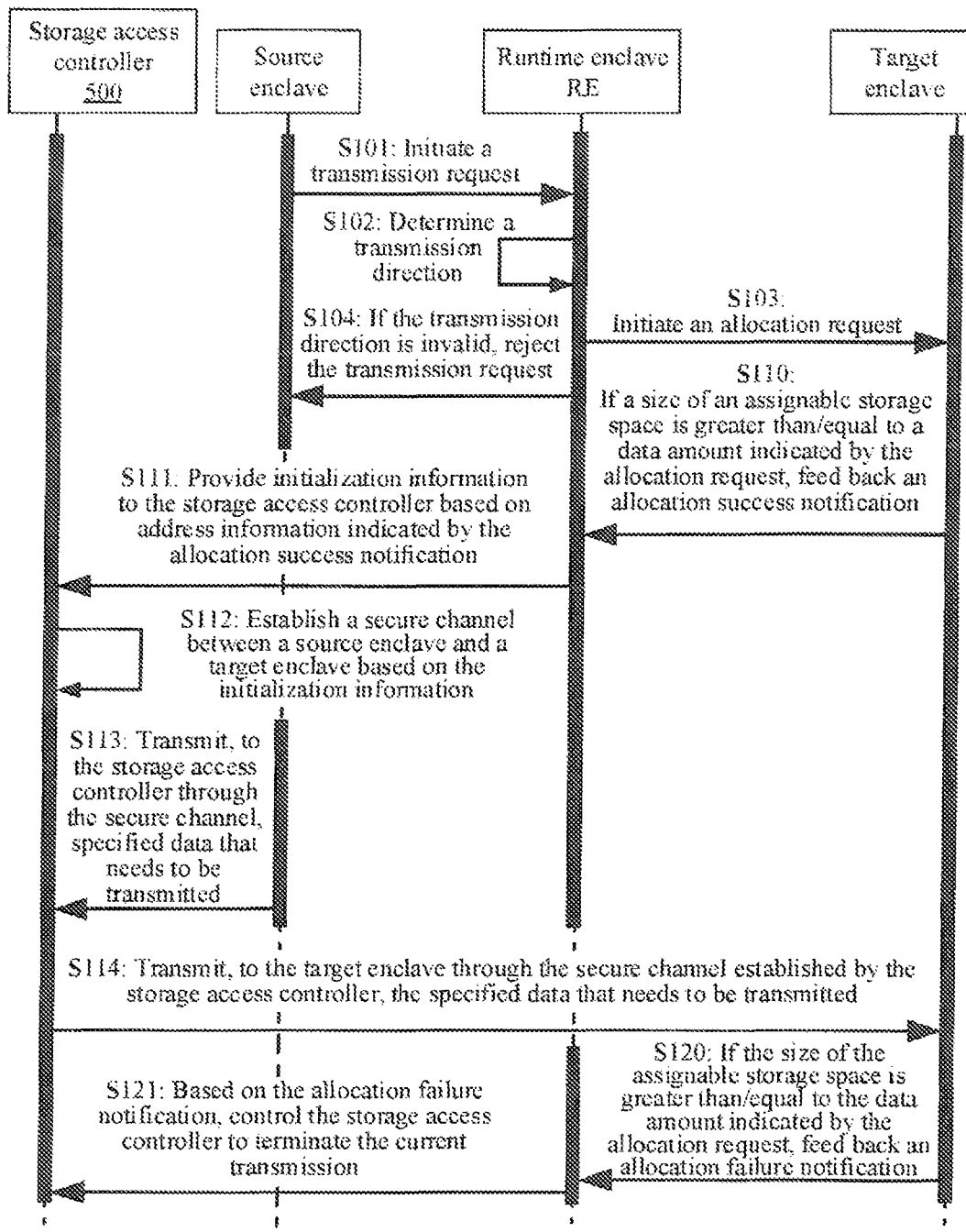
FIG. 9 is a schematic flowchart of a security control method according to an embodiment of the present disclosure.

FIG. 9 is a schematic flowchart of a security control method according to an embodiment of the present disclosure. The security control method shown in FIG. 9 can be implemented based on the schemes shown in FIG. 1 to FIG. 8 or modified schemes, and for example, includes the following steps.

Step S101: A corresponding program running in a source enclave (for example, a first application program App1 running in a first application enclave) initiates a transmission request when needing to transmit specified data to a target enclave (for example, a second application enclave AE2). The transmission request includes source address information (for example, a start physical address of specified data that needs to be transmitted) of data that needs to be transmitted, destination address information (used to point to the target enclave, where the destination address information is, for example, a tag, a number, or a start physical address of the target enclave that needs to receive the specified data) of the data that needs to be transmitted, and information about an amount of the data to be transmitted (for example, a quantity of bytes of the data that needs to be transmitted)

Step S102: A control program receives the transmission request, and determines, according to a control rule, whether a transmission direction indicated by the transmission request is valid. If yes, step S103 is performed; if not, step S104 is performed.

In this embodiment, initiators of transmission requests received by the control program may be inconsistent. Therefore, the control program may verify validity of the request based on a preset control rule to avoid active read operations between different enclaves, thereby ensuring that information in the enclaves is not leaked.

The control rule for the transmission request by the control program may include: determining whether a storage address corresponding to the source address information indicated by the transmission request is located in the source enclave. If yes, it indicates that the source enclave is the initiator of the transmission request, that is, the transmission request is not used to read/invoke/execute information provided by other enclaves, and the request is valid in this case; if not, it indicates that the initiator of the transmission request is not the source enclave, that is, the transmission request is used to access data stored in the source enclave from outside the source enclave, which may lead to malicious acquisition of sensitive information stored in the source enclave, and therefore in this case, the control program in the embodiments of the present disclosure determines that the transmission request is invalid.

In some optional embodiments, one or more control rules may be preset for the control program, and are not limited to the foregoing control rules. For example, one of the control rules of the control program may include: for a transmission request initiated by a program running in a specified enclave or some specified enclaves (for example, an application enclave), the control program can directly reject the transmission request, with no need to determine a transmission direction. For another example, one of the control rules of the control program may include: the control program prohibits a program running in one or some specified enclaves from initiating a transmission request.

Step S104: If the control program determines, in step S102, that the transmission request is invalid, the control program rejects the transmission request, so as to terminate the data transmission process initiated by the source enclave.

Step S103: The control program further generates an allocation request (including at least the information about the amount of the data that needs to be transmitted) based on the transmission request, and sends the allocation request to the target enclave to which the transmission request points.

In some other embodiments, step S102 may be skipped and step S103 is performed directly.

A program running in the target enclave (for example, a second application program App2 running in the second application enclave AE2) determines, based on the allocation request, whether a size of an assignable storage space in the target enclave is greater than/equal to the data amount indicated by the allocation request. If not, step S120 is performed: the second application program App2 returns an allocation failure notification to a runtime enclave RE, so that in response to the allocation failure notification, the control program controls a storage access controller 500 in step S121 to terminate the current data transmission; if yes, step S110 is performed: the target enclave returns an allocation success notification to the runtime enclave RE.

The allocation success notification includes at least information (for example, address information such as a start physical address of a free target storage area in the second application enclave AE2) used for indicating an allocated address, used to store the specified data to be transmitted, in the target enclave.

Step S111: After receiving the allocation success notification, the control program provides initialization information to the storage access controller based on the allocation success notification. The initialization information includes at least the source address information and the data amount information that are indicated by the transmission request, the allocated address information indicated by the allocation success notification, and so on.

Step S112: The storage access controller 500 completes initialization setting based on the received initialization information. The initialized storage access controller 500 may establish a secure channel based on the initialization information, and the secure channel is used to transmit (which may be understood as copy) the specified data (corresponding to the source address information and the data amount information that are indicated by the transmission request) stored in the source enclave to a target storage area (corresponding to the allocated address information indicated by the allocation success notification) in the target enclave.

In step S112, the storage access controller that has completed the initialization setting may initiate a takeover request to the processor, so that the storage access controller 500 can obtain the control right of the bus structure after the processor returns a takeover permission signal to the storage access controller (in this case, the bus structure presents a high-impedance state to the processor), and the storage access controller that obtains the bus control right can provide a selected channel as the secure channel.

Step S113: The source enclave transmits, to the secure channel established in step S108, the specified data that needs to be transmitted.

Step S114: The storage access controller transmits the specified data provided by the source enclave in step S113 to the target storage area in the target enclave based on the secure channel established in step S112.

In step S114, the storage access controller may determine whether the current data transmission has been completed. For example, in some embodiments, the storage access controller may monitor an amount of data that has been transmitted in the current data transmission, and compare the detected data amount with the data amount information indicated by the initialization information. If the detected data amount is the same as a total data amount indicated by the data amount information in the initialization information, it indicates that the data that needs to be transmitted this time has been transmitted. If the detected data amount does not reach the total data amount indicated by the data amount information, it indicates that there is still data that has not been transmitted (that is, the current data transmission has not been completed).

In step S114, if determining that the current transmission has been completed, the storage access controller terminates the current transmission and restores the control right of the bus structure for the processor; or if determining that the current transmission has not been completed, the storage access controller continues to transmit the specified data.

In some conventional schemes, a process of data transmission between different trusted execution environments is implemented based on a program executed by a processor. To-be-transmitted data in a memory needs to be stored in a processor first, and then the processor provides the to-be-transmitted data to a target storage space, featuring a relatively low data transmission speed and limiting efficiency of electronic devices that are implemented based on the trusted execution environments. For another example, in some conventional technologies, the process of data transmission between different trusted execution environments needs to be implemented by invoking functional functions. Therefore, such technology still requires involvement of the processor to implement data transmission between two trusted execution environments. Compared with these conventional schemes, in the embodiments of the present disclosure, for the processing apparatus, a data transmission channel between two enclaves can be established by the storage access controller, not affecting security performance; the process of data transmission between different enclaves does not require involvement of the processor, and data transmission between two enclaves in the storage unit can be implemented directly through the secure channel, thereby increasing a speed of inter-enclave data transmission and improving performance of the electronic device, such as a running speed and a response speed.

In some conventional schemes, the electronic device is divided into two parts: a secure part and a normal part. All trusted application programs run in the secure part, and each application program running in an entire secure part has the possibility of being attacked. More application programs running in the secure part indicate a greater risk of being attacked, and different application programs running in the secure part may also interfere with each other. In contrast, various programs that need to be protected/trusted in this embodiment of the present disclosure run in different enclaves isolated from each other. Therefore, it can be ensured that data of all application programs is securely and independently protected in different enclaves, avoiding leakage of sensitive information and improving security.

In some conventional schemes, required data and code (for example, a static link library and a dynamic link library) are loaded by default in the trusted execution environments used for running the application programs. Therefore, data transmission does not need to be performed between different trusted execution environments, and there is no technical enlightenment related to the purpose of "implementing the process of data transmission between different trusted execution environments".

In conclusion, compared with the conventional schemes, in the processing apparatus, the embedded system, the system-on-chip, and the security control method provided in the embodiments of the present disclosure, TEEs may be established based on a plurality of enclaves, different programs may run independently in different enclaves, and the storage access controller may be configured to establish a secure channel for unidirectional data transmission between the source enclave and the target enclave in the plurality of enclaves. The data transmission process provided by the present disclosure does not require involvement of the processor. Compared with the prior art, the embodiments of the present disclosure can improve inter-enclave communication efficiency under the premise of ensuring information security, thereby increasing the response speed of programs running in the enclaves, and providing strong support for performance improvement of the processing apparatus, the electric device, the embedded system, and the system-on-chip, and improvement of user experience.

In some embodiments, the runtime enclave in the plurality of enclaves provides a trusted execution environment used for running the control program, thereby further ensuring high efficiency of the process of data transmission between the source enclave and the target enclave under the premise of ensuring data security.

In some embodiments, the control program running in the runtime enclave may control the data transmission between the source enclave and the target enclave based on various preset control rules, thereby implementing flexible control and optimization of the data transmission process. For example, whether a data transmission direction is valid may be determined based on the control rules of the control program, so as to avoid accidentally leaking sensitive information from an enclave to other enclaves.

In some embodiments, the control program running in the runtime enclave may initiate, based on the transmission request, an allocation request to the target enclave to be written into, so as to determine whether the target enclave has enough storage space to receive the specified data that needs to be transmitted, thereby avoiding overwriting valid data in the target enclave.

It should be understood that the foregoing descriptions are merely preferred embodiments of the present disclosure and are not intended to limit the present disclosure. For those skilled in the art, there are many variations for the embodiments of this specification. Any modification, equivalent replacement, and improvement made without departing from the spirit and principle of the present disclosure shall fall within the protection scope of the present disclosure.

It should be noted that FIG. 2 merely shows one possible application scenario of the embodiments of the present disclosure. The embodiments of the present disclosure may also be applied to other application scenarios, especially applied to scenarios that are strongly associated with sensitive information of users.

Figure 10:
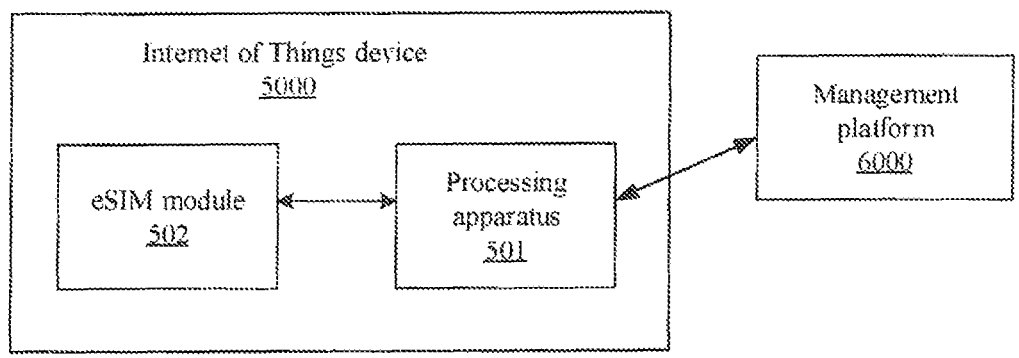
FIG. 10 is a schematic diagram of another exemplary application scenario according to an embodiment of the present disclosure.

For example, FIG. 10 shows another possible application scenario of the embodiments of the present disclosure. The apparatus in the embodiments of the present disclosure may use an electronic subscriber identification module (Subscriber Identification Module, SIM for short) to implement user identity authentication. In a case without a physical SIM card, the user downloads a file required for the subscriber identification module to a terminal device through a public network, and uses a management platform (denoted as 6000 in FIG. 10) at the network end to manage the subscriber identification module in the terminal device. In this way, in the case without a physical SIM card, the user can directly access a network service provided by a communications operator. The subscriber identification module is, for example, an embedded SIM (Embedded Subscriber Identification Module, eSIM for short) or a TEE SIM.

As shown in FIG. 10, in a terminal device 5000 (which is, for example, implemented based on the electronic device and/or the embedded system in the embodiments of the present disclosure), a subscriber identification module 502 may communicate with the processing apparatus (denoted as 501 in FIG. 10) in the foregoing embodiments, so that the processing apparatus can run an authentication program (which authenticates validity of received data based on user information), an encryption/decryption program (performing encryption and decryption on the data verified as valid), and the like based on information provided by the subscriber identification module 502. In some examples not shown, the subscriber identification module can also be integrated in the processing apparatus as a software module, a hardware module, or a module combining software and hardware. Programs such as the authentication program and the encryption/decryption program that are used to support the subscriber identification module involve sensitive information such as the user identity, and therefore need to run in different isolated enclaves within the processing apparatus. In some cases, these programs running in different enclaves also need to use data provided by other enclaves. Based on the embodiments of the present disclosure, the processing apparatus supporting the subscriber identification module may establish a secure channel between different enclaves, so that a source enclave for running a program (for example, an authentication program) can directly transmit, through a corresponding secure channel, specified data (for example, an authentication result generated by the authentication program) to a target enclave (for example, for running the encryption/decryption program) that needs to receive the specified data. The specified data does not need to be stored in the processor for the processor to transmit the specified data to the target enclave. This not only ensures security of inter-enclave data transmission (ensures that the transmitted sensitive information is not stolen), but also improves efficiency of inter-enclave data transmission, thereby improving product performance and user experience.

For another example, the apparatus of the foregoing embodiments can be applied to devices such as smart cars, smart vending machines, or smart robots. In these devices, a first program (such as a program involving user identity information) can run in an enclave provided by the processing apparatus, and directly transmits specified data provided by the first program to another enclave of the processing apparatus through a configured secure channel, so that a program (such as a payment program or a recommended algorithm program) running in the another enclave can perform processing on the specified data provided based on the secure channel.

It can be learned that the apparatus provided in the embodiments of the present disclosure has a simplified structure and does not require transferring by the processor during inter-enclave data transmission, and therefore features relatively high data transmission efficiency and data processing efficiency, and relatively low power consumption, having broad application prospects in various embedded application scenarios of low power consumption.

It should be understood that the embodiments in this specification are described in a progressive manner, the same or similar parts of the embodiments are referred to each other, and each embodiment focuses on differences from other embodiments. Especially, a method embodiment is basically similar to a method described in the apparatus and system embodiments, and therefore is described briefly; for related parts, reference may be made to partial descriptions in the other embodiments.

It should be understood that the specific embodiments of this specification are described above. Other embodiments fall within the scope of the claims. In some cases, actions or steps described in the claims may be performed in an order different from that in the embodiments, and may still implement desired results. In addition, the process described in the accompanying drawings does not necessarily follow the illustrated particular sequence or sequential sequence to implement the desired results. In some embodiments, multitask processing and parallel processing are also acceptable or may be advantageous.

It should be understood that providing descriptions in a singular form in this specification or showing only one component in the accompanying drawings does not mean limiting a quantity of components to one. In addition, the modules or components described or shown in this specification as separate may be combined into a single module or component, and a single module or component described or shown in this specification may be split into a plurality of modules or components.

It should also be understood that the terms and expressions used herein are intended only for description, and that one or more embodiments of this specification should not be limited to those terms and expressions. Use of these terms and expressions does not imply exclusion of equivalent features of any indication and description (or a part thereof), and it should be recognized that any possible modifications should also fall within the scope of the claims. Other modifications, changes, and replacements may also exist. Correspondingly, the claims shall be considered to cover all these equivalents.

The invention claimed is:

1. A processing apparatus, comprising:
a processor adapted to execute a program;
a memory coupled to the processor and adapted to provide a plurality of enclaves isolated from each other, wherein the plurality of enclaves is a source enclave, a target enclave, and a runtime enclave, wherein the source enclave and the target enclave each is adapted to provide a storage space required for running a corresponding program, and wherein the runtime enclave is adapted to determine a data transmission direction based on preset control rules; and
a storage access controller adapted to transmit specified data, stored in the source enclave to the target enclave, based on the determined data transmission direction.

2. The processing apparatus according to claim 1, wherein the runtime enclave is different from the source enclave and the target enclave, and
wherein the runtime enclave is further adapted to provide a storage space required for running a control program.

3. The processing apparatus according to claim 1, wherein the source enclave is adapted to:
generate a transmission request and send the transmission request to the runtime enclave, so that the control program configures the storage access controller based on the transmission request to transmit the specified data stored in the source enclave to the target enclave.

4. The processing apparatus according to claim 3, wherein the transmission request comprises a source address information, and
wherein, before the control program configures the storage access controller to transmit the specified data stored in the source enclave to the target enclave, the control program checks whether the source address information points to the source enclave that transmits the transmission request, and when the source address information points to the source enclave that transmits the transmission request, the control program allows the storage access controller to transmit the specified data stored in the source enclave to the target enclave.

5. The processing apparatus according to claim 3, wherein, before the control program configures the storage access controller to transmit the specified data stored in the source enclave to the target enclave, the control program checks whether a transmission function is disabled for the source enclave transmitting the transmission request, and when the transmission function is not disabled for the source enclave transmitting the transmission request, the control program allows the storage access controller to transmit the specified data stored in the source enclave to the target enclave.

6. The processing apparatus according to claim 3, wherein the transmission request comprises to-be-transmitted data amount information, and before the storage access controller transmits the specified data stored in the source enclave to the target enclave, the control program sends an allocation request to the target enclave, and
wherein the allocation request comprises the to-be-transmitted data amount information, so that the target enclave determines whether a size of an assignable storage space in the target enclave is greater than or equal to the to-be-transmitted data amount information indicated by the allocation request, and when the size of the assignable storage space in the target enclave is greater than or equal to the to-be-transmitted data amount information indicated by the allocation request, the target enclave sends a transmission acknowledgement response to the storage access controller, so that the storage access controller transmits the specified data stored in the source enclave to the target enclave.

7. The processing apparatus according to claim 6, wherein the transmission acknowledgement response comprises an allocated address information which points to a target storage area, allowed to receive the specified data, in the target enclave.

8. The processing apparatus according to claim 4, wherein the storage access controller further comprises:
a source address register adapted to store the source address information;
a destination address register adapted to store destination address information, wherein the destination address information points to the target enclave or a specified storage area, for receiving the specified data, in the target enclave; and
a control module adapted to select one of a plurality of channels provided by the storage access controller as a secure channel for transmitting the specified data stored in the source enclave to the target enclave.

9. The processing apparatus according to claim 8, wherein the storage access controller further comprises:
a status register adapted to provide a status value for each of the channels, wherein the status value is used to indicate whether a corresponding channel is in an available state, so that the control module selects, based on the status value, a channel in the available state as the secure channel.

10. A system-on-chip comprising the processing apparatus according to claim 1.

11. A security control method comprising:
configuring a plurality of enclaves isolated from each other in a memory, wherein the plurality of enclaves is a source enclave, a target enclave, and a runtime enclave, wherein the source enclave and the target enclave each is adapted to provide a storage space required for running a corresponding program, and wherein the runtime enclave is adapted to determine a data transmission direction based on preset control rules;
configuring a secure channel; and
transmitting specified data stored in the source enclave to the target enclave through the secure channel, based on the determined data transmission direction.

12. The security control method according to claim 11, wherein the runtime enclave is different from the source enclave and the target enclave, and the security control method further comprises:
running a control program in the runtime enclave, and wherein the secure channel is uniquely configured by the control program, so that the specified data stored in the source enclave is transmitted to the target enclave via the secure channel.

13. The security control method according to claim 12, wherein the control program receives a transmission request sent by the source enclave, and configures the secure channel based on the transmission request, so that the specified data stored in the source enclave is transmitted to the target enclave via the secure channel.

14. The security control method according to claim 13, wherein the transmission request comprises source address information, and wherein, before the control program configures the secure channel, the control program checks whether the source address information is within the source enclave transmitting the transmission request, and when the source address information is within the source enclave transmitting the transmission request, the control program allows transmitting the specified data stored in the source enclave to the target enclave.

15. The security control method according to claim 13, wherein, before the control program configures the secure channel, the control program checks whether a transmission function is disabled for the source enclave transmitting the transmission request, and when the transmission function is not disabled for the source enclave transmitting the transmission request, the control program allows transmitting the specified data stored in the source enclave to the target enclave.

16. The security control method according to claim 13, wherein the transmission request comprises to-be-transmitted data amount information, and before the specified data stored in the source enclave is transmitted to the target enclave, the control program sends an allocation request to the target enclave, and wherein the allocation request comprises the to-be-transmitted data amount information, so that the target enclave determines whether a size of an assignable storage space in the target enclave is greater than or equal to the to-be-transmitted data amount information indicated by the allocation request, and when the size of the assignable storage space in the target enclave is greater than or equal to the to-be-transmitted data amount information indicated by the allocation request, the target enclave sends a transmission acknowledgement response, so that the secure channel transmits the specified data stored in the source enclave to the target enclave.

17. The security control method according to claim 16, wherein the transmission acknowledgement response comprises allocated address information, and wherein the allocated address information points to a target storage area, allowed to receive the specified data, in the target enclave, and wherein the control program configures the secure channel, based on the allocated address information, so that the secure channel transmits the specified data stored in the source enclave to the target storage area in the target enclave.

18. The security control method according to claim 14, wherein the step of configuring the secure channel comprises:

selecting one of a plurality of channels as the secure channel based on the source address information and destination address information, so that the secure channel transmits the specified data stored in the source enclave to the target enclave to which the destination address information points, or a specified storage area, for receiving the specified data, in the target enclave.

* * * * *